United States Patent [19]

Ikemura et al.

[11] Patent Number: 4,611,653

[45] Date of Patent: Sep. 16, 1986

[54] VENTILATION SYSTEM

[75] Inventors: Akio Ikemura, Kurobe; Minoru Kajiki, Toyama, both of Japan

[73] Assignee: Yoshida Kogyo K. K., Tokyo, Japan

[21] Appl. No.: 753,590

[22] Filed: Jul. 10, 1985

[30] Foreign Application Priority Data

Jul. 10, 1984 [JP] Japan .................. 59-104179[U]

[51] Int. Cl.⁴ ............................................. F28D 19/00
[52] U.S. Cl. ...................................... 165/54; 98/33.1; 165/7; 165/909
[58] Field of Search ....................... 98/31, 33.1; 165/7, 165/10, 47, 48.1, 53, 54, 151, 901, 909

[56] References Cited

U.S. PATENT DOCUMENTS

| | | | |
|---|---|---|---|
| 3,977,466 | 8/1976 | Johansson | 165/909 X |
| 4,048,811 | 9/1977 | Ito et al. | 98/33.1 X |
| 4,183,398 | 1/1980 | Ehrke | 165/7 X |
| 4,497,361 | 2/1985 | Hajicek | 165/7 |
| 4,513,809 | 4/1985 | Schneider et al. | 165/909 X |
| 4,523,518 | 6/1985 | Gartner | 98/31 |

FOREIGN PATENT DOCUMENTS

| | | | |
|---|---|---|---|
| 204817 | 1/1955 | Australia | 165/7 |
| 2536297 | 3/1976 | Fed. Rep. of Germany | 165/7 |
| 2014720 | 8/1979 | United Kingdom | 165/7 |

Primary Examiner—Harold Joyce
Attorney, Agent, or Firm—Hill, Van Santen, Steadman & Simpson

[57] ABSTRACT

A ventilation system comprising a heat-exchanger rotor mounted in a four-chamber housing supported on a panel or window unit, and a preliminary heat-exchange unit mounted at an air-intake portion of the housing. The window unit has a frame composed of a plurality of hollow structural sections defining a heat-medium passageway for circulation of heat medium such as hot water or cold water therethrough. The preliminary heat-exchanger unit has a radiation/endothermy tube connected to the heat-medium passageway for fluid communication therewith. The radiation/endothermy tube serves to prewarm or precool air (introduced from the exterior) before the latter passes through the heat-exchanger rotor.

3 Claims, 7 Drawing Figures

VENTILATION SYSTEM

BACKGROUND OF THE INVENTION

1. Field of the Invention

The present invention relates to a ventilation system with a built-in heat-exchanger for use or a building wall, a curtain wall, a window panel on a similar wall panel.

2. Prior Art

One known ventilator with a built-in heat-exchanger is disclosed in Japanese Patent Laid-Open Publication (Kokai) No. 59-74443 published Apr. 26, 1984. The prior ventilator has a discharge passage for delivering air from the interior to the exterior, and a supply passage for delivering air from the exterior to the interior; heat transfer takes place between these two air flows as the latter pass through a heat-exchanger rotor which rotates at a relatively low speed in the ventilator.

The Japanese Publication also teaches a technical concept of warming and cooling the interior to a uniform room temperature by the provision of an air passageway and a heat-medium passageway, both extending in and through hollow structural sections of a window frame. Heat medium, such as hot water or cold water, is circulated through the heat-medium passageway to warm or cool air as the latter flows in the air passageway through the window frame. The warmed or cooled air flows from an outlet in the window frame into the interior.

However, with the prior ventilator, effective warming and cooling was difficult to achieve.

To this end, one attempt has been proposed in which a preliminary heat-exchanger is provided to prewarm air (introduced from the exterior) somehow before the air passes through a heat-exchanger rotor. But this attempted system was at variance with reality and hence was not put to industrial use, because the following questions remained unsettled: (1) where a source of heat should be provided; and (2) in cooling, a separate cooling unit is required.

SUMMARY OF THE INVENTION

According to the present invention, a ventilation system comprises a heat-exchanger rotor mounted in a four-chamber housing supported on a panel or window unit, and a preliminary heat-exchanger unit mounted at an air intake portion of the housing. The window unit has a frame composed of a plurality of hollow structural sections defining a heat-medium passageway for circulation of heat medium such as hot water or cold water therethrough. The preliminary heat-exchanger unit has a radiation/endothermy tube connected to the heat-medium passageway for fluid communication therewith. The radiation/endothermy tube serves to prewarm or precool air (introduced from the exterior) before the latter passes through the heat-exchanger rotor.

It is therefore an object of the present invention to provide a ventilation system by which ventilation can take place without risk of impairing warming and cooling effect.

Another object of the invention is to provide a ventilation system of simple construction by which effective warming and cooling can take place with no added separate source of heat medium.

Many other advantages, features and additional objects of the present invention will become manifest to those versed in the art upon making reference to the detailed description and the accompanying drawings in which a preferred embodiment incorporating the principles of the present invention is shown by way of illustrative example.

DETAILED DESCRIPTION

Figure 1:
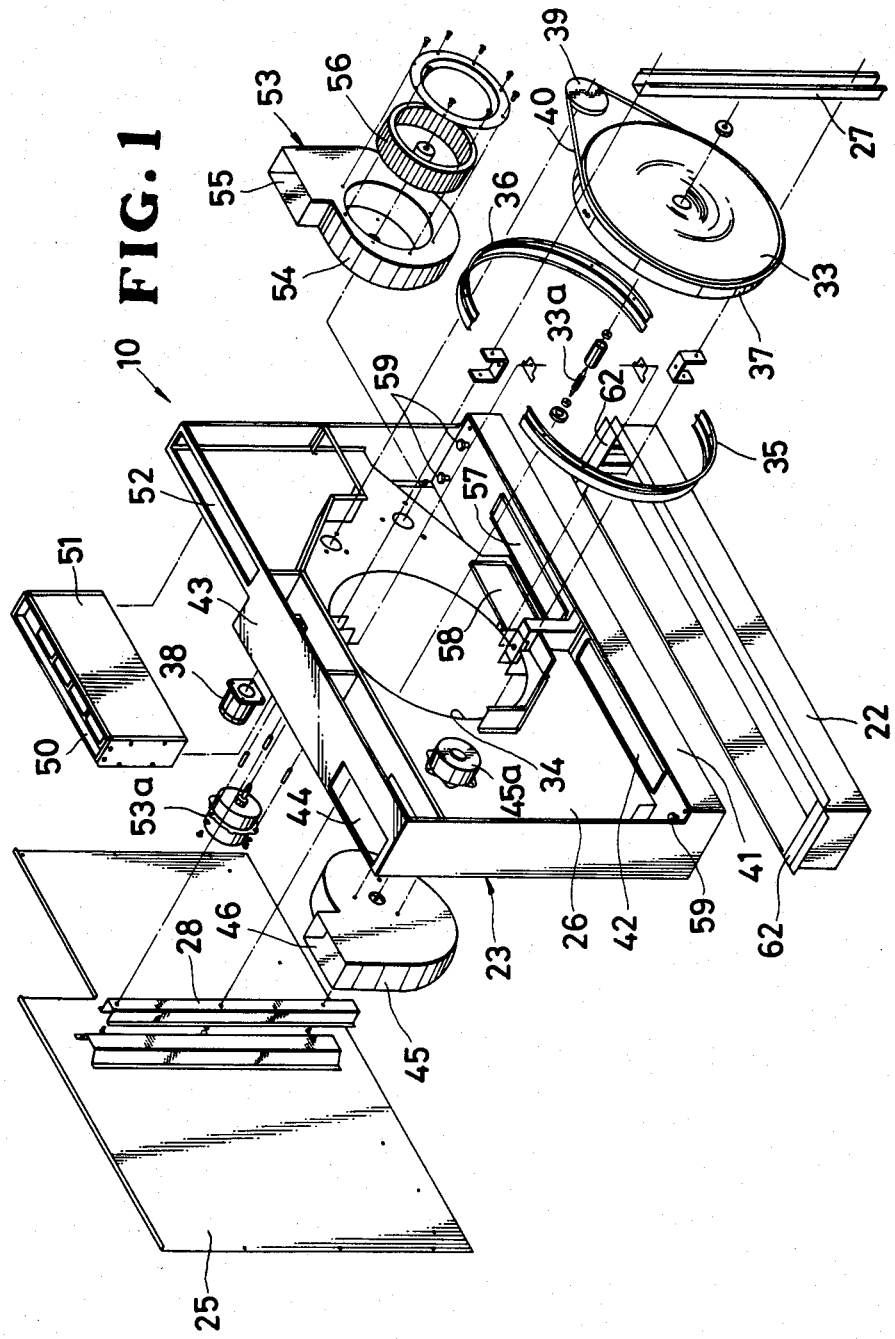
FIG. 1 is an exploded perspective view of a ventilator embodying the present invention.
Figure 2:
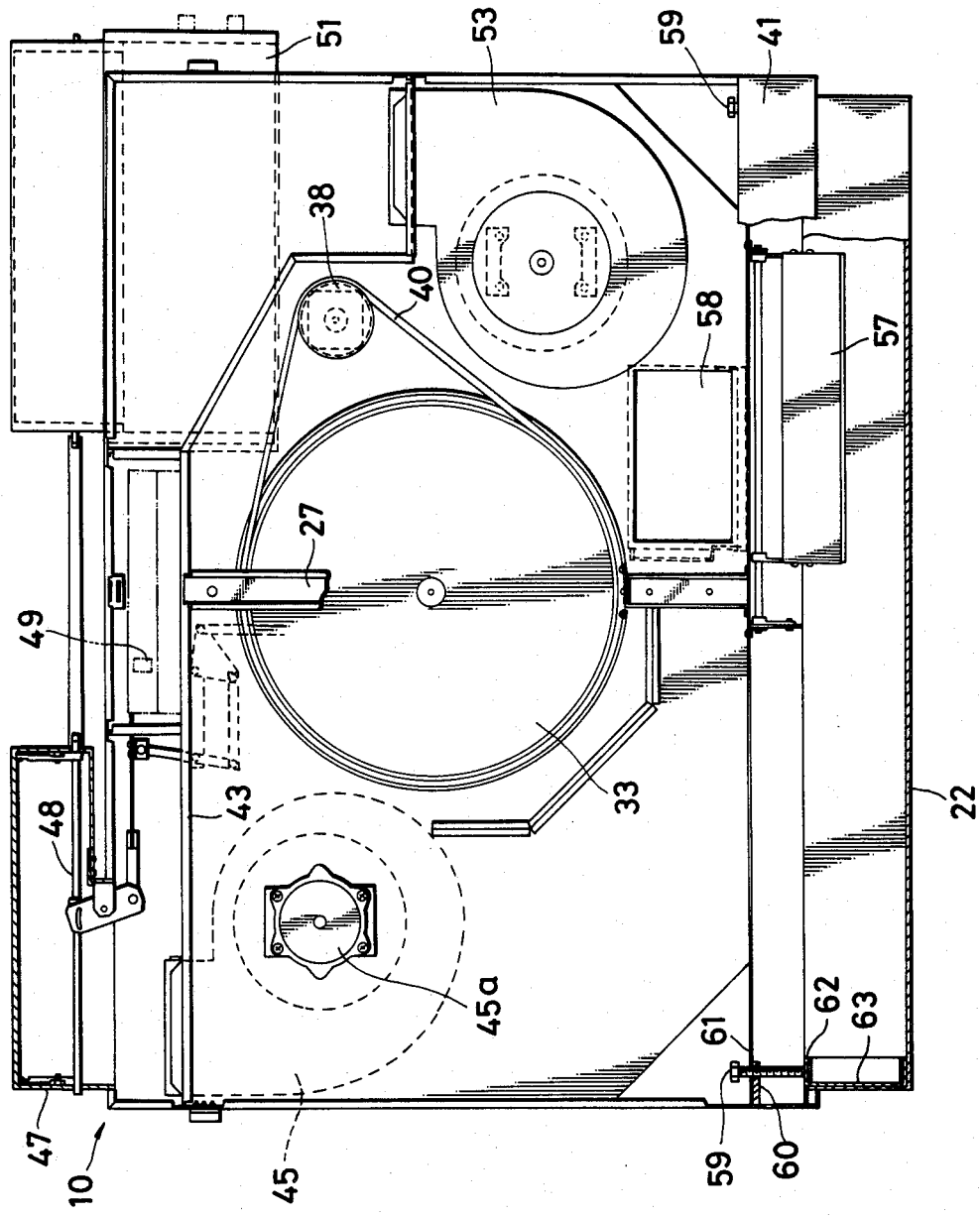
FIG. 2 is a front elevational view, partly in cross section, of the ventilator.
Figure 3:
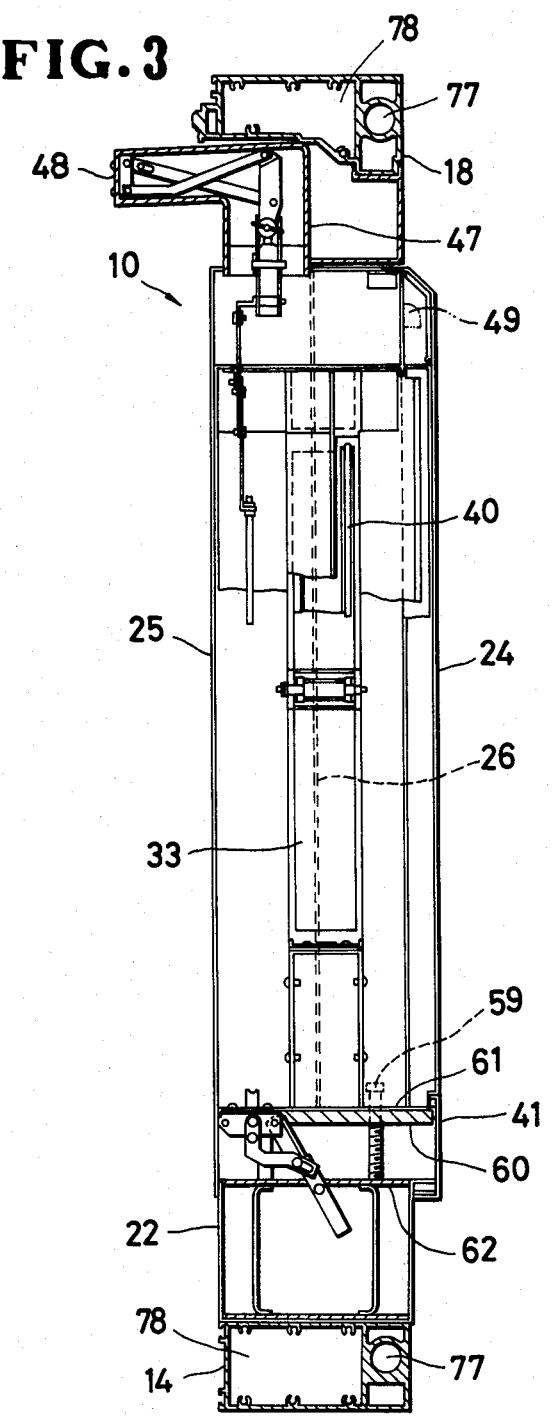
FIG. 3 is a side elevational view, with parts broken away, of the ventilation system having been mounted on a window unit.

The principles of the present invention are particularly useful when embodied in a ventilator as shown in FIGS. 1 through 3, generally indicated by the numeral 10.

The ventilator 10 has the function of a heat-exchanger and can be mounted on a building wall, a curtain wall, a window panel, or a wall panel (disposed in the interior of a building).

Figure 6:
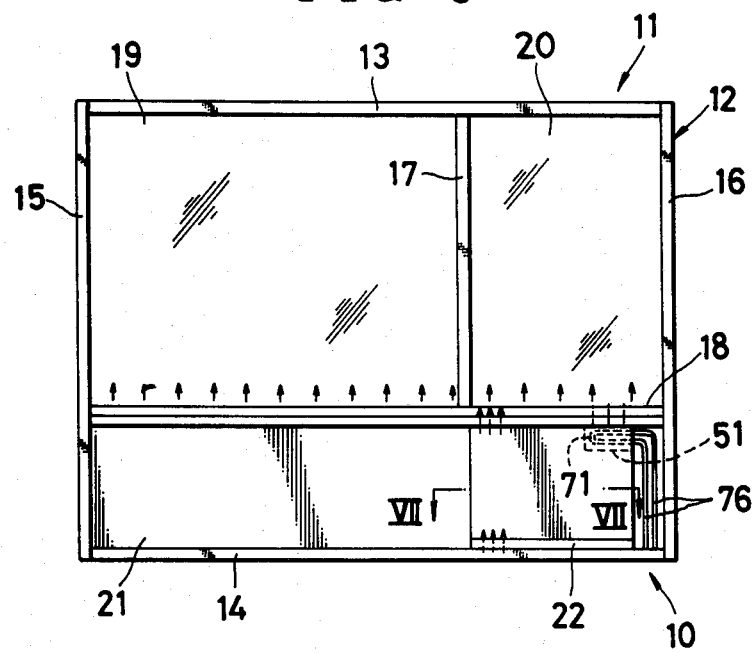
FIG. 6 is a front elevational view of the window unit on which the ventilator is mounted.

As shown in FIG. 6, the ventilator 10 is assembled in a window unit 11 having a window frame or sash 12. The window frame is composed of a header 13, a sill 14, a pair of side jambs 15, 16, a vertical bar or mullion 17, and a transom 18. The window unit 11 includes a pair of glass panes 19, 20 supported jointly by the header 13, the side jambs 15, 16, the mullion 17 and the transom 18. The ventilator 10 is disposed between the transom 18 and the sill 14 in a position underneath the glass pane 20. The window unit 11 also includes a panel 21 disposed between the transom 18 and the sill 14 adjacent to the ventilator 10. The ventilator 10 is supported on a skirt 22 for height adjustment as described below.

Each of the frame members of the window frame 12, i.e. the header 13, the sill 14, the side jambs 15, 16 and the transom 18, has a heat-medium passageway 77 (FIG. 3) and an air passageway 78, both defined in and extending along the respective frame member. The heat-medium passageway 77 serves to circulate heat medium, such as hot water or cold water, in and through the window frame 12 to prewarm or precool air from the exterior before the air passes through a heat-exchanger rotor 33 (described below). The warmed or cooled air flows from the rotor 33 into the interior of the room via the air passageway 78.

Figure 7:
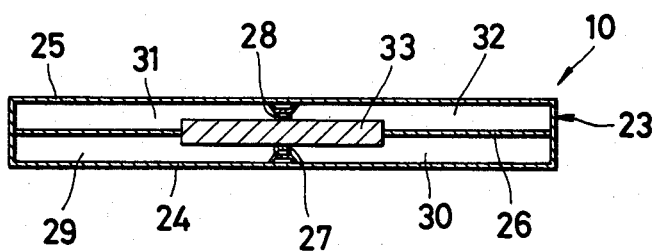
FIG. 7 is an enlarged cross-sectional view taken along line VII—VII of FIG. 6, with parts omitted.

As illustrated in FIG. 7, the ventilator 10 includes a frame or housing 23 comprising an inner cover panel 24 positioned on the interior side of the window unit 11, an outer cover panel 25 positioned on the exterior side thereof in parallel relation to the inner cover panel 24, and a central partition 26 disposed between the inner and outer cover panels 24, 25 in parallel relation thereto. The frame 23 also has a pair of inner and outer partitions 27, 28 joined respectively to the inner and outer cover panels 24, 25. These three partitions 26, 27, 28 divide the interior space of the housing 23 into a first inner chamber 29, a second inner chamber 30, a first outer chamber 31, and a second outer chamber 32. The inner and outer partitions 27, 28 support the heat-exchanger rotor 33 positioned centrally between these four chambers 29, 30, 31, 32. Heat-exchange takes place between an air-flow passing from the first inner chamber 29 into the first outer chamber 31 via one half (FIG. 7) of the rotor 33. Since the heat-exchanger rotor 33 is a conventional type well known in the art, a detailed description of its construction and operation is omitted here for clarity.

As illustrated in FIGS. 1 through 3, the central partition 26 has a central circular hole 34 in which the rotor 33 is rotatably supported by an axle 33a supported between the inner and outer partitions 27, 28. A pair of semicircular bearing members 35, 36 is mounted in the central circular hole 34 along its inner edge, each bearing member 35, 36 having a labyrinth packing (not shown) which fills up the gap between the periphery of the rotor 33 and the central portion 26. In operation, the rotor 33 is rotated at a relatively low speed by a motor 38 mounted on the central partition 26; rotation of the motor 38 is transferred to the rotor 33 via a pulley 39 coupled to the motor 38 and an endless belt 40 trained around the pulley 39 and an outer circular frame 37 of the rotor 33.

The central partition 26 is coupled to a lower horizontal frame member 41 having a first opening 42 positioned at the bottom of the first inner chamber 29 (FIG. 7) and opening thereto, the first opening 42 communicating with the interior side of the window unit 11 via the skirt 22 and the sill 14 (FIG. 6). The central partition 26 is also coupled to an upper horizontal frame member 43 having a second opening 44 positioned at the top of the first outer chamber 31 (FIG. 7) and opening thereto. The second opening 44 communicates with the exterior side of the window unit 11 via a duct 47 (FIGS. 2 and 3) mounted in the transom 18. A discharge fan 45 is mounted in the first outer chamber 31 and has an outlet 46 connected to the second opening 44. The discharge fan 45 is driven by a motor 45a supported on the central partition 26 for discharging air from the interior side of the window unit 11 into the exterior side thereof via the first inner chamber 29, the rotor 33, the first outer chamber 31, the discharge fan 45, the second opening 44, and the duct 47. The duct 47 accomodates therein a first damper 48 which is openable and closable by a switch 49 (FIGS. 2 and 3) supported on the upper frame member 43. The first damper 48 is closed when the ventilator 10 is shut off or when air is circulated in the interior side of the window unit 11.

Figure 4:
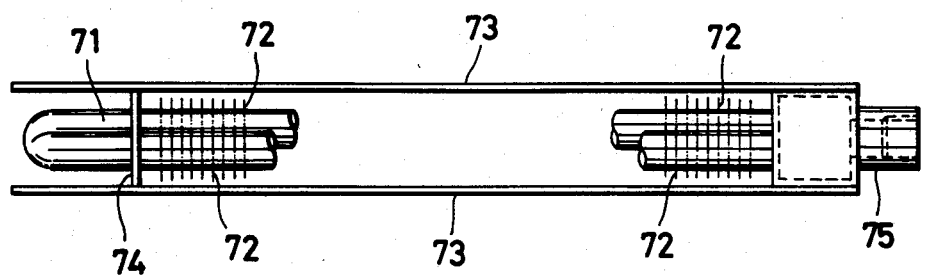
FIG. 4 is a plan view of a heat exchanger built into the ventilator.
Figure 5:
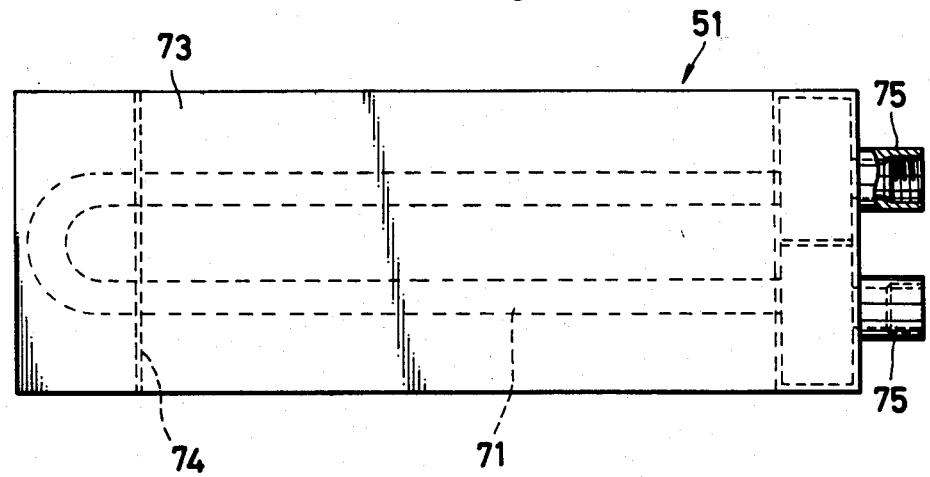
FIG. 5 is a front elevational view of FIG. 4.

FIGS. 4 and 5 illustrate a preliminary heat-exchanging unit 51 which has a third opening 50 (FIG. 1) positioned at the top of the second outer chamber 32 and communicating therewith. The heat-exchanging unit 51 includes a generally U-shaped raditation/endothermy tube 71 communicating with the heat-medium passageway 77 in the window frame 12. The radiation/endothermy tube 71 serves to warm air, introduced from the exterior, by hot water in advance of the passage of that air through the rotor 33 when the interior is to be warmed. The radiation-endothermy tube 71 serves also to cool air, introduced from the exterior, by cold water in advance of the passage of that air through the rotor 33 when the interior side is to be cooled. The heat-exchanging unit 51 also has a pair of parallel side walls 73, 73 and support wall 74 extending therebetween and supporting the radiation/endothermy tube 71 in position between the side walls 73, 73, and a pair of sockets 75, 75 through which opposite ends of the radiation/endothermy tube 71 are adapted to be connected to a pair of connecting pipes 76, 76 (FIG. 6) and thus to the heat-medium passageway 77 in the window frame 12. The radiation/endothermy tube 71 has a multiplicity of fins 72 which serve to assist in warming or cooling the introduced air from the exterior with improved efficiency.

As shown in FIGS. 1 through 3, the upper frame member 43 has a fourth opening 52 communicating with the interior side of the window unit 11 through the transom 18. A supply fan 53 is mounted in the second inner chamber 30 and comprises a scroll 54 having an outlet 55 connected to the fourth opening 52, and an impeller 56 rotatably mounted in the scroll 54. The supply fan 53 is driven by a motor 53a supported on the central partition 26 for introducing air from the exterior side of the window unit 11 into the interior side thereof via the third opening 50, the second outer chamber 32, the rotor 33, the second inner chamber 30, the supply fan 52, and the transom 18.

The lower frame member 41 supports therein a second damper 57 disposed at the bottom of the second inner chamber 30 and openable to provide communication between the second inner chamber 30 and the interior via the skirt 22 and the sill 14. To circulate air through the interior side of the window unit 11 for a uniform room temperature, the second damper 57 is opened and, at the same time, the supply fan 53 is operated to draw air from the interior into the second inner chamber 30 via the sill 14, the skirt 22 and the damper 57, and then to return the air from the second inner chamber 30 into the interior via the fourth opening 52.

A third damper 58 is supported on the central partition 26 and is openable for communication between the second inner and outer chambers 30, 32 in bypassing relation to the rotor 33. As the third open damper 58 is opened and, at the same time, the supply fan 53 is operated, air drawn from the exterior via the third opening 50 is delivered from the second outer chamber 32 directly into the inner chamber 30 via the damper 58, and is then supplied by the supply fan 53 into the interior via the fourth opening 52. At that time, a portion of the air passes through the rotor 33 that is held at rest. Accordingly, fresh air can be supplied from the exterior into the interior without involving any heat-exchange between air flows in the rotor 33.

Four height adjustment screws 59 are threaded through the respective corners of the rectangular lower frame member 41 and a pair of back plates 60 (FIGS. 2 and 3) fixed to the under-surface of an upper wall 61 of the lower frame member 41. The screws 59 have their distal ends held against the upper surfaces of upper flanges 62 of a pair of channel-shaped reinforcements 63 disposed in the skirt 22. The ventilator 10 can be raised with respect to the transom 18 and the sill 14 by turning the screws 59 in such a direction as to move the latter into the lower frame member 41, and can be lowered by turning the screws 59 in the reverse direction.

With the ventilator 10, since air introduced from the exterior is prewarmed or precooled by the preliminary heat-exchanger unit 51 in advance of passage of the air through the heat-exchanger rotor 33, ventilation can take place without risk of impairing the warming and cooling effect. Further, since hot water or cold water is used as heat medium for circulation through the heat-medium passageway 77 in the window frame 12 which passageway communicates with the radiation/endothermy tube 70, the ventilator 10 is simple in construction requiring no added separate source of heat medium.

Although various minor modifications may be suggested by those versed in the art, it should be understood that we wish to embody within the scope of the patent warranted hereon, all such embodiments as reasonably and properly come within the scope of our contribution to the art.

What is claimed is:

1. A ventilation system, comprising:
   (a) a wall or window unit having a frame composed of a plurality of hollow structural sections defining a heat-medium passageway for circulation of a heat medium through said frame;
   (b) a housing supported on said frame and divided into first and second inner chambers and first and second outer chambers, said housing having a first opening for communication between said first inner chamber and the interior, a second opening for communication between said first outer chamber and the exterior, a third opening for communication between said second outer chamber and the exterior, and a fourth opening for communication between said second inner chamber and the interior;
   (c) a heat-exchanger rotor rotatably mounted in said housing and providing communication between said first inner and outer chambers and also between said second inner and outer chambers;
   (d) a discharge fan mounted in said first outer chamber for delivering air from the interior to the exterior via said second opening;
   (e) a supply fan mounted in said second inner chamber for delivering air from the exterior to the interior via said fourth opening; and
   (f) a preliminary heat-exchanger unit supported on said housing and connected to said fourth opening for prewarming and precooling, selectively, air from the exterior before the air passes through said heat-exchanger rotor, said preliminary heat-exchanger unit having a radiation/endothermy tube connected to said heat-medium passageway for communication therewith.

2. A ventilation system according to claim 1, said radiation/endothermy tube having a multiplicity of fins over its peripheral surface.

3. A ventilation system according to claim 1, said hollow structural sections of said frame further defining an air passageway extending alongside of said heat-medium passageway for communication with the interior, said passageway being connected at one end to said fourth opening for delivering the warmed or cooled air from said heat-exchanger rotor to the interior.

* * * * *